(12) United States Patent
Mazzoccoli et al.

(10) Patent No.: US 9,336,909 B2
(45) Date of Patent: May 10, 2016

(54) DEPOSITION OF INTEGRATED PROTECTIVE MATERIAL INTO ZIRCONIUM CLADDING FOR NUCLEAR REACTORS BY HIGH-VELOCITY THERMAL APPLICATION

(71) Applicant: Westinghouse Electric Company LLC, Cranberry Township, PA (US)

(72) Inventors: Jason P. Mazzoccoli, Pittsburgh, PA (US); Edward J. Lahoda, Edgewood, PA (US); Peng Xu, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 126 days.

(21) Appl. No.: 14/548,630

(22) Filed: Nov. 20, 2014

(65) Prior Publication Data

US 2015/0098545 A1    Apr. 9, 2015

Related U.S. Application Data

(62) Division of application No. 13/670,808, filed on Nov. 7, 2012, now Pat. No. 8,971,476.

(51) Int. Cl.
*G21C 3/07*    (2006.01)
*G21C 3/324*    (2006.01)
*G21C 21/02*    (2006.01)
*C23C 24/04*    (2006.01)
*C23C 28/00*    (2006.01)
(Continued)

(52) U.S. Cl.
CPC ... *G21C 3/07* (2013.01); *C23C 4/02* (2013.01); *C23C 4/06* (2013.01); *C23C 4/10* (2013.01); *C23C 4/12* (2013.01); *C23C 4/129* (2016.01); *C23C 24/04* (2013.01); *C23C 28/321* (2013.01); *C23C 28/324* (2013.01); *G21C 3/324* (2013.01); *G21C 21/02* (2013.01); *C23C 4/00* (2013.01); *Y02E 30/40* (2013.01)

(58) Field of Classification Search
CPC ............. G21C 3/07; C23C 4/06; C23C 4/08; B05D 1/12
USPC ........... 376/305, 414, 416, 457; 427/455, 456
See application file for complete search history.

(56) References Cited

U.S. PATENT DOCUMENTS 3,503,791 A    3/1970  Armand et al.
3,620,691 A *  11/1971 Rubel ...................... G21C 3/06
                                                                    376/416
(Continued)

FOREIGN PATENT DOCUMENTS

JP    2001004768    1/2001

OTHER PUBLICATIONS

PCT International Search Report, PCT/US2013/071151, Sep. 16, 2014.

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A zirconium alloy nuclear reactor cylindrical cladding has an inner Zr substrate surface (10), an outer volume of protective material (22) consisting of Zr—Al, and an integrated middle volume (20) of zirconium oxide, zirconium and protective material, where the protective material is applied by impaction at a velocity greater than 340 meters/second to provide the integrated middle volume (20) resulting in structural integrity for the cladding.

7 Claims, 5 Drawing Sheets

(51) Int. Cl.
  *C23C 4/10*   (2016.01)
  *C23C 4/06*   (2016.01)
  *C23C 4/02*   (2006.01)
  *C23C 4/12*   (2016.01)
  *C23C 4/00*   (2016.01)

(56) References Cited

U.S. PATENT DOCUMENTS

| | | | |
|---|---|---|---|
| 3,926,832 A | 12/1975 | Barosi | |
| 4,049,841 A | 9/1977 | Coker et al. | |
| 4,751,044 A * | 6/1988 | Hwang | G21C 3/06 376/416 |
| 4,894,203 A | 1/1990 | Adamson | |
| 5,026,517 A | 6/1991 | Menken et al. | |
| 5,171,520 A | 12/1992 | Bryan et al. | |
| 5,267,289 A | 11/1993 | Bryan | |
| 5,301,211 A | 4/1994 | Bryan et al. | |
| 5,519,748 A | 5/1996 | Adamson et al. | |
| 5,793,830 A | 8/1998 | Kim et al. | |
| 6,005,906 A | 12/1999 | Van Swam | |
| 6,231,969 B1 | 5/2001 | Knight et al. | |
| 6,420,002 B1 | 7/2002 | Aggas et al. | |
| 7,407,903 B2 | 8/2008 | Sundberg et al. | |
| 7,815,964 B2 | 10/2010 | Lahoda et al. | |
| 8,580,350 B2 | 11/2013 | Choi et al. | |
| 8,591,986 B1 | 11/2013 | Ajdelsztajn et al. | |
| 8,675,809 B2 | 3/2014 | Lahoda et al. | |
| 8,778,459 B2 | 7/2014 | Farmer et al. | |
| 8,792,607 B2 | 7/2014 | Kim et al. | |
| 2006/0039524 A1 | 2/2006 | Feinroth et al. | |
| 2009/0022259 A1 | 1/2009 | Gray et al. | |
| 2010/0014624 A1 | 1/2010 | Lutz et al. | |
| 2011/0002434 A1 | 1/2011 | Lahoda et al. | |
| 2011/0170653 A1 | 7/2011 | Cabrero et al. | |
| 2011/0317800 B2 | 12/2011 | Johnson | |

* cited by examiner

US 9,336,909 B2

DEPOSITION OF INTEGRATED PROTECTIVE MATERIAL INTO ZIRCONIUM CLADDING FOR NUCLEAR REACTORS BY HIGH-VELOCITY THERMAL APPLICATION

CROSS REFERENCE TO RELATED APPLICATION

This application is a divisional application of and claims priority to U.S. patent application Ser. No. 13/670,808, filed Nov. 7, 2012 entitled DEPOSITION OF INTEGRATED PROTECTIVE MATERIAL INTO ZIRCONIUM CLADDING FOR NUCLEAR REACTORS BY HIGH-VELOCITY THERMAL APPLICATION.

BACKGROUND

1. Field

This invention relates to integrated protective impregnation deposition into nuclear cladding.

2. Description of Related Art

The exposure of zirconium cladding to the high-temperature and high pressure water environment in a nuclear reactor can result in the corrosion (oxidation) of the surface and consequent hydriding (due to the hydrogen release into the metal from the oxidation reaction with water) of the bulk cladding, ultimately leading to metal embrittlement. This weakening of the metal can adversely affect the performance, life-time, and safety margin of the nuclear fuel core. Recognizing this, many attempts to coat the zirconium outer surface with one or more layers of various materials have been tried, for example, Knight et al., Bryan et al., Van Swam and Lahoda et al. (U.S. Pat. Nos. 6,231,969; 5,171,520; 6,005,906; and 7,815,964, respectively), The simple inclusion of an oxidation resistant coating on the zirconium surface can, in theory, protect the zirconium substrate from the reactor environment; however, strong adherence of the coating to the zirconium substrate is problematic due to a fine oxidation layer that always exists on top of the zirconium surface as shown in prior art FIG. 1. These prior art processes often result in the coating peeling or spalling of the oxide surface when the coated cladding is exposed to prior art reactor operating conditions.

Knight et al. disclose a discrete coating such as $Ti_3SiC_2$ with less than 30% porosity with a thickness between 0.002 inch and 0.005 inch. Bryan et al. disclose initial heating of the cladding from 300° C. to 400° C., and flame spraying a mixture of zircon, about 30 micrometers, diameter and glass binder, less than 10 micrometers, to provide an intermixed discrete coating on the cladding.

Lahoda et al. disclose abrading the surface of the zirconium cladding to remove oxides and surface deposits, and spraying boron, gadolinium, hafnium, erbium, $HfB_2$, $ZrB_2$, $Gd_2O_3$, or $Er_2O_3$ or their mixtures all burnable poisons having particle sizes from 1 micrometer to 250 micrometers, at a velocity of from 1,500 ft./sec. to 2,500 ft./sec. (457 meter/sec. to 762 meter/sec.). This initiates a surface phase change at the exterior surface of the cladding, so some molecular melting occurs (inter-atom bonding or forming craters) and the impacting particles provide a still discrete impacted surface coating. Van Swam provides discrete "coatings"layers of different oxygen content zirconium claddings, as many as three.

Knight et al. further disclose coating processes ranging from dipping/painting, chemical adsorption and thermal spraying. Bryan et al. (U.S. Pat. No. 5,301,211) disclose a linear magnatron sputtering apparatus to uniformly coat zirconium alloy nuclear cladding in an atmosphere of argon gas. A variety of coating materials are mentioned, including TiN, TiAlN, TiC and TiCN. Coker et al. (U.S. Pat. No. 4,049,841) generally teach plasma and flame spraying techniques.

Cabrero et al. (U.S. Patent Application Publication No. US20110170653A1) disclose cladding totally or partially made of a composite of a SiC ceramic fiber matrix, in the form generally of random orientation, weaves, knits or felts. This can include several superimposed layers. This matrix includes a carbide, for example, TiC and $Ti_3SiC_2$.

What is needed is a new type of protective means; a main object of this invention is to provide this and solve the problems described above.

SUMMARY

The above problems have been solved and Objects accomplished by providing a zirconium alloy nuclear reactor cylindrical cladding, subject to a nuclear reactor environment, the cladding having an inner surface and inner volume of zirconium alloy, an outer surface and outer volume of a protective material, selected from the group consisting of Ti—Al—C ceramic, iron-based alloy, a Nanosteel Super Hard Steel® class of materials (herein referred to as Nanosteel®), or an alloy comprising only a mixture of Zr—Al, and an integrated middle volume of zirconium oxide, zirconium, and in excess of the sound velocity impacted protective material where the highest density of protective material is at the cladding outer surface to protect the cladding from reactor environment and any further oxidation of the zirconium, where the integrated middle volume provides structural integrity for the cladding.

The invention also resides in a method of forming an integrated gradient network of protective particles into the $ZrO_2$ layer and base Zr tube of nuclear reactor cladding comprising the steps of: providing a Zr alloy nuclear reactor cladding having a $ZrO_2$ layer; providing a protective material; optionally heating the nuclear reactor cladding; loading the protective material into a hybrid thermal-kinetic deposition or cold thermal spray apparatus; and impacting at high velocity the nuclear reactor cladding with the protective material to impact through the $ZrO_2$ layer and into the base Zr alloy to provide an integrated gradient network of protective particles, protective particles plus the $ZrO_2$ and Zr and a base Zr.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 2:
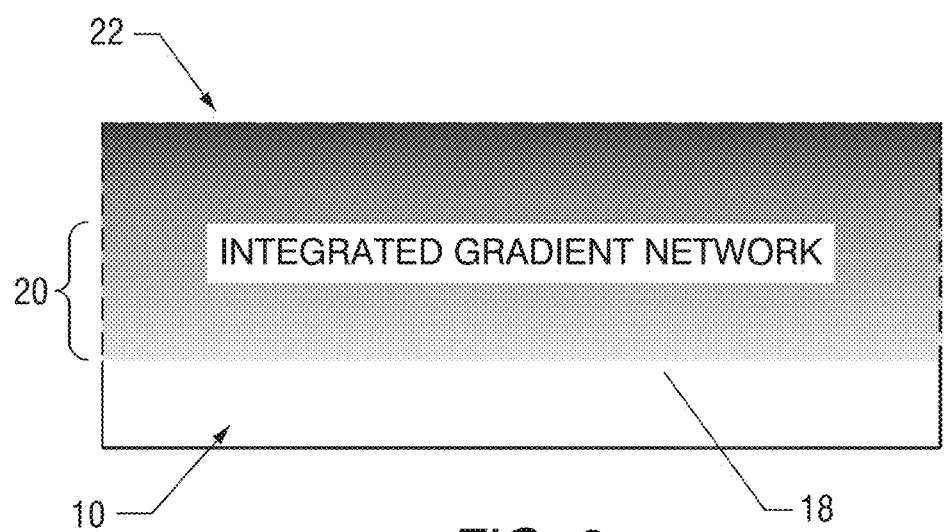
FIG. 2 is an idealized schematic cross-section of the protective integrated gradient network mixing with $ZrO_2$ and penetrating into the Zr substrate.

We have discovered a hybrid kinetic-thermal deposition process in conjunction with Ti—Al—C ceramics (such as $Ti_2AlC$ or some other elemental variant thereof) or iron-based alloys (which may be amorphous, semi-amorphous, or metallic alloys that may contain additional elements such as Al or C or Cr), Nanosteel®, or a Zr—Al alloy that can be used to form an integrated gradient layer comprised of the ceramic or metallic alloy mixed with the surface oxide, which penetrates in the zirconium substrate to form a robust adherent matrix that protects the zirconium metal from destructive bulk oxidation when exposed to reactor conditions. This deposition approach uses a combination of heat and kinetic energy to propel the ceramic or metallic alloy into the surface of the substrate. The material may be heated above its melting point during the deposition process, however, this is not a functional requirement of forming the gradient layer, and as such, the embodiment of this invention includes deposition below or above the melting point of the deposition material. A schematic of the deposition technique is shown in FIGS. 2 and 3.

In general, the invention utilizes thermal-kinetic deposition (including a cold spray application) to form mixed iron-based glassy amorphous/semi-amorphous/metallic alloy-$ZrO_2$ gradients or mixed Ti—Al—C ceramic-$ZrO_2$ or Nanosteel® gradients, or Zr—Al alloy gradients into, not just onto, the surface of nuclear grade zirconium cladding. Oxidation resistant iron based alloys or Ti—Al—C based ceramics, or alloys of Zr—Al are distributed directly into/within/penetrating the oxide layer that is present on all unprotected zirconium surfaces. The presence of this deposited network results in a gradient emanating from the cladding surface which effectively eliminates bulk oxidation and hydriding of the zirconium upon exposure to pressurized water (PWR) or boiling water reactor (BWR) conditions. The deposition technique itself is a hybrid thermal-kinetic or cold spray process in which the materials are heated and propelled in some optimized fashion towards the Zr substrate. The term "hybrid kinetic-thermal deposition" is defined as a process in which a high velocity gas propels particles of the protective material into the surface oxide and underlying bulk zirconium layers at a velocity greater than sound (>340 m/s). The particle sizes are chosen to be large enough to deeply penetrate the boundary layer formed by the flowing gas jet around the tube, the oxide layer and the unoxidized tube alloy material, hut small enough to interact with the structural material of the tube and the other protective particles to form an impermeable protective layer.

This may or may not melt the material as it is deposited, depending on the application temperature. The thermal-kinetic or cold spray application in combination with either of the aforementioned materials results in an oxide free interface between the zirconium and the reactor environment. As such, the zirconium cladding is imparted with enhanced corrosion resistance, providing significant improvement in performance and safety.

Applicable protective particle size is 1-500 micrometers for both cold or hot techniques. Cold spray temperatures are 250° C.-1,200° C., Material is propelled using a pressurized inert gas (to prevent excessive oxidation of the zirconium surface) such as $N_2$, He, or Ar. Typical spray velocities exceed the speed of sound>340 m/s. HVOF (high velocity oxygen fuel) and application temperature is 800° C.-2,800° C. The velocity of the spray exceeds the speed of sound, >340 ms, preferably 400 m/s to 1,200 ms, most preferably 450 ms to 1,000 ms, Kerosene is one propellant material, while other species such as propylene, acetylene, natural gas, or other combustible gases or liquids can also be used. HVOF (or cold spray) may also be done while surrounding the substrate in an inert environment to reduce or eliminate surface oxidation during deposition.

Figure 1:
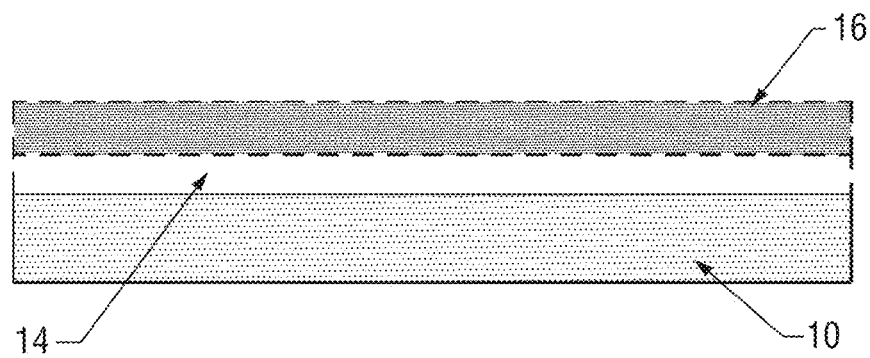
FIG. 1 is an idealized schematic cross-section of a prior art protective coated nuclear cladding.

Referring now to FIG. 1 which shows prior art discrete coating on a $ZrO_2$ layered ZrO surface. The surface in this case is the top half of a nuclear cladding tube. The Zr substrate is shown as 10, and the $ZrO_2$ layer (surface oxide) as 14 and the discrete top protective coating layer as 16.

FIG. 2 is a general schematic of the subject invention, with Zr substrate 10, deposited material mix of protective material +$ZrO_2$ penetrating into the Zr substrate—all shown as 20 and high density outer portion of protective material as 22.

The coating approach of prior art FIG. 1 only applies material on top of the $ZrO_2$ layer, resulting in poor adhesion and potential failure. The integrated deposition technique of this invention, FIGS. 2 and 3, mixes oxidation resistant material directly into the $ZrO_2$ layer which ultimately penetrates into the Zr substrate itself resulting in strong adhesion and a dense oxidation resistant surface that protects the underlying substrate from the reactor environment. There is substantial "cratering" of the material through the $ZrO_2$ clue to the kinetic force with which the protective material is applied. It arrives with sufficient kinetic energy/force to penetrate the thin oxide layer that exists on the cladding surface and forms a thickness of the deposition of the protective material between 1 μm and 200 μm.

Figure 3A:
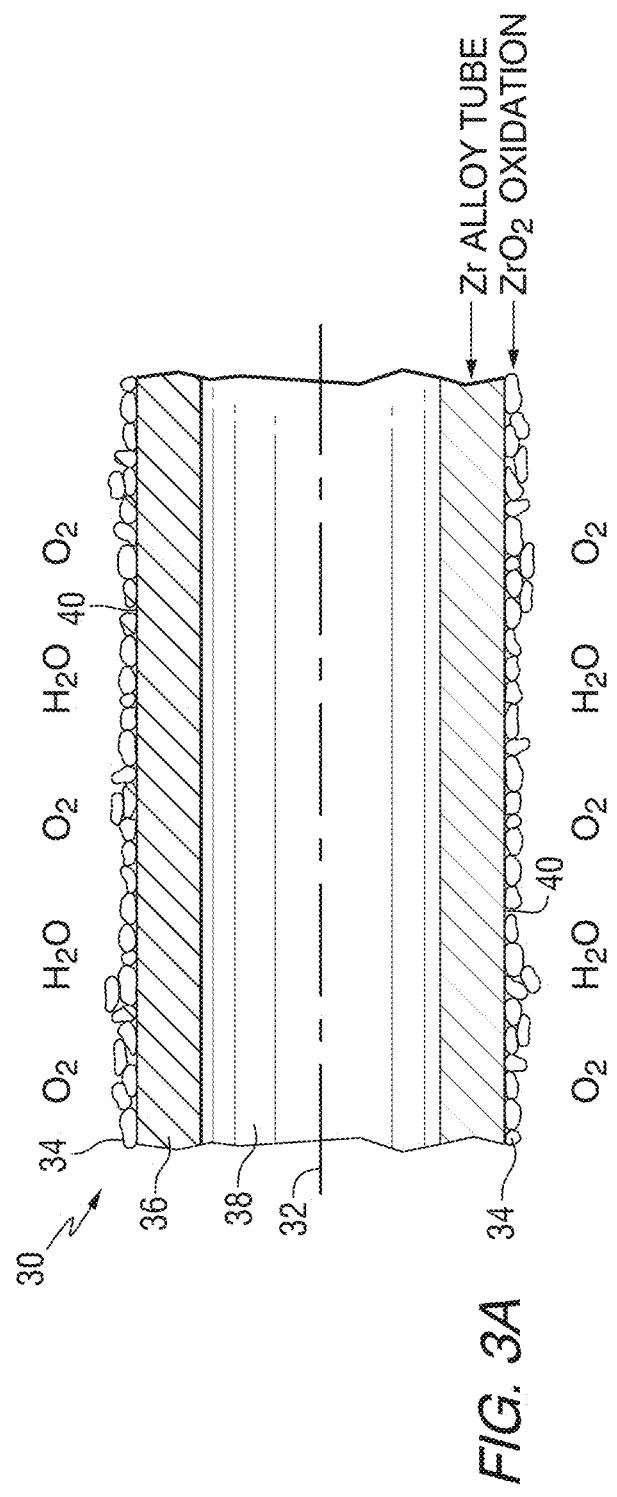
FIG. 3A is one embodiment of a schematic cross-section of a zirconium alloy nuclear sheath composite having at least two sheaths, the composite containing zirconium oxide scale on its outside surface; fuel pellets would be contained in the center of the sheath.
Figure 3B:
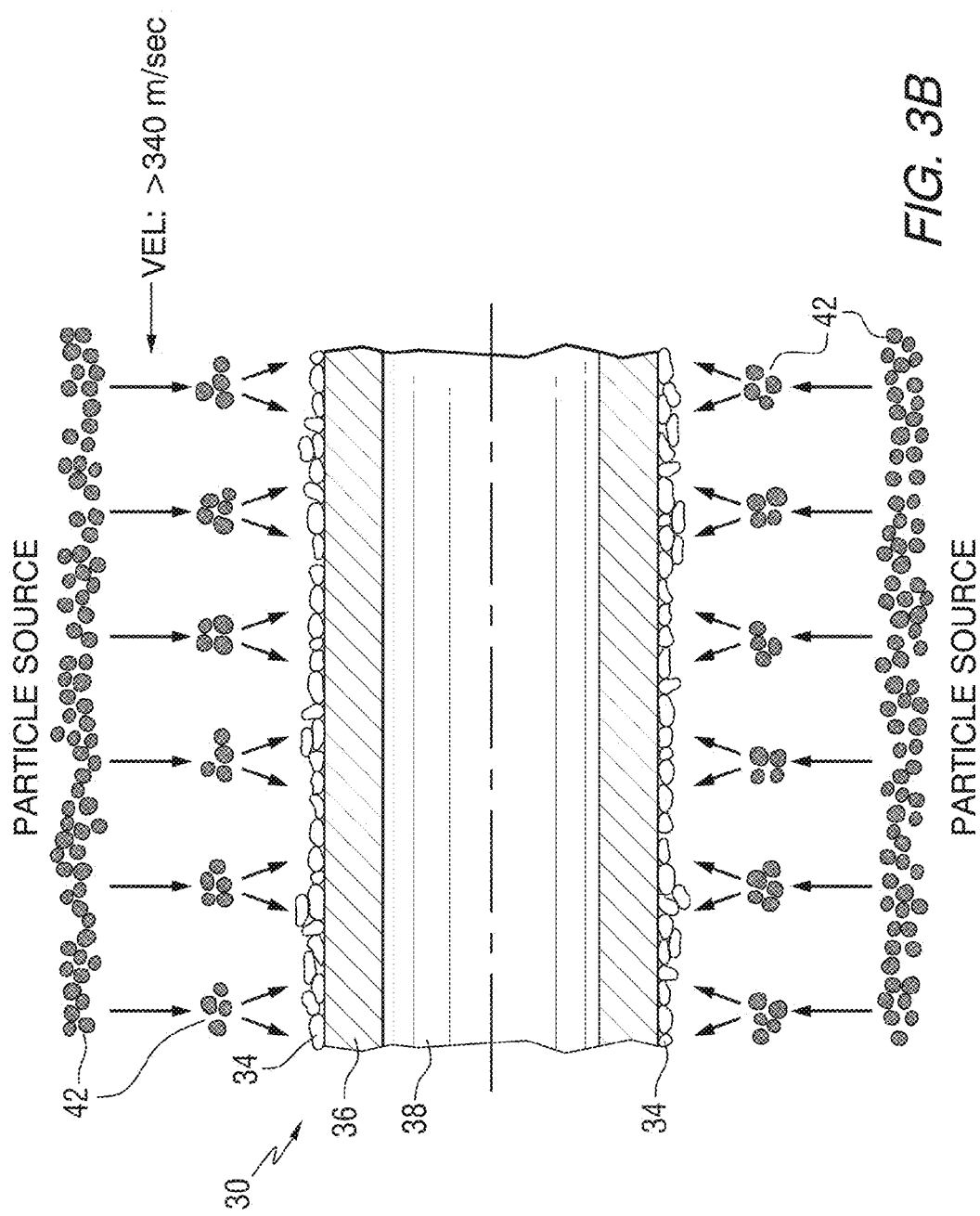
FIG. 3B is a schematic cross-section of the sheath of FIG. 3A where, for sake of simplicity, one sheath is shown; the sheath being impinged by titanium-based or iron-based particles, or Zr—Al alloy particles at a high velocity from a particle source onto a heated zirconium surface of FIG. 3A.
Figure 3C:
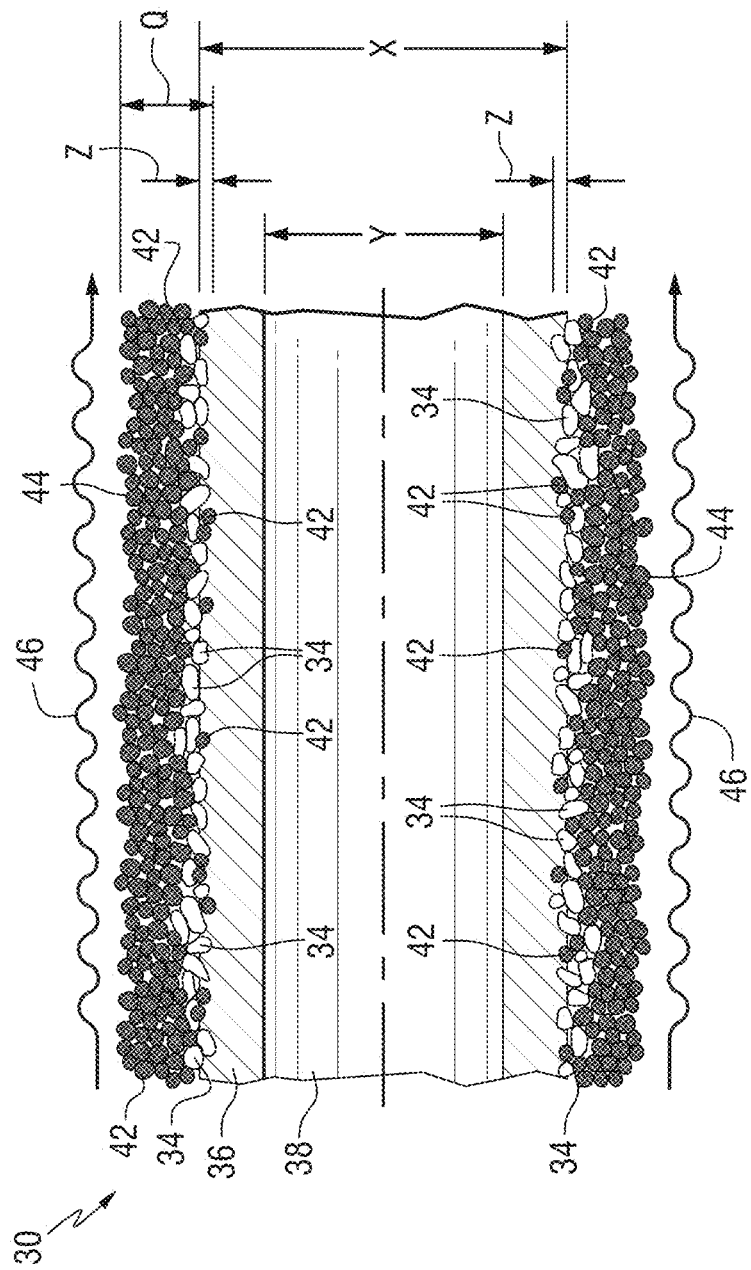
FIG. 3C is the finalized zirconium alloy nuclear sheath of FIG. 3B where the particles impinge the oxide coated tube and ultimately crater into the zirconium by penetrating and mixing with the oxide scale, forming a gradient of particles into the intermediate/middle layer of the zirconium alloy sheath.

FIGS. 3A-3C show the process and result of this invention in more detail. FIG. 3A is a schematic of a cylindrical zirconium alloy nuclear reactor cladding 30 having an axis 32 in a normal environment of $H_2O$ during operation or, normal ambient air, where invariably an oxide coating 34 grows, in this case $ZrO_2$ since the cladding 30 is made of greater than 95% Zr alloy 36. The cylinder bore is shown as 38. This is the starting situation. The oxide coating/layer 34 is generally 10 nanometers thick, which translates to several atomic layers of $ZrO_2$ if only exposed to air and is comprised of a reasonably tight but still porous $ZrO_2$ coating adhering to the top surface 40 of the cladding before use.

FIG. 3B illustrates the process of "high velocity," meaning up to 3½ times the speed of sound, impacting of the protective material 42 using thermal-kinetic deposition techniques, which in some cases can be first used to initially heat the reactor cladding to an outer top surface temperature from 200° C. to 400° C. in a non-oxidizing atmosphere, with the interior remaining substantially cooler, and impact the protective material at a velocity greater than the speed of sound >340 meters/second, which velocity and heating at temperatures between 1,200° C. and 3,500° C. combine to effect extremely high impact directly through the $ZrO_2$ scale 34 and deep into the Zr alloy 36 forming substantial cratering and an adherent network, shown in FIG. 3C.

The particle size of the protective material should be relatively large to create massive impact and substantial cratering of the Zr alloy 36 but small enough to allow particle to particle interactions to form a tight, impermeable layer. The particle size is generally from 1 micrometers to 500 micrometers, preferably from 10 micrometers to 100 micrometers. Under 1 micrometers, the impact effect will be less effective leading to excessive particle loss and insufficient penetration.

The protective particles can be either $Ti_xAl_yC_z$ ceramic where x=2 to 4; y=1 to 1 and z=1 to 3; or iron-based alloy $Fe_xAl_yCr_z(G)$ where x=0 to 70, y=0 to 30, and z=0 to 30 and (G) is comprised of any number of minor constituents that may include the elements Ni, Si, Mn, Mo, P, S, Co, W, B, or C. The protective particles can also be Nanosteel® which has the composition: material chemistry (wt %); Cr<25%; W<15%; Nb<12%; Mo<6%; B<5%; C<4%; Mn<3%; Si<2%; and Fe balance. Additionally, the deposited particles could have a formulation that is comprised of a Zr—Al alloy, where Al may comprise up to 99.9 atom % of the alloy. However, the preferred protective particles are Ti—Al—C, and the most preferred formulation is $Ti_2AlC$. $Ti_2AC$ is preferred because it is corrosion resistant to >1,250° C. These integrated protective layers also serve to improve the fuel reliability and the fuel cycle economics because they are hard and resist wear. In addition, these layers have a very high temperature capability that enables better corrosion resistance, and consequently are more accident-tolerant at high temperature accident conditions.

Referring now to FIG. 3C, the final hybrid thermal-kinetic deposited protective gradient nuclear reactor cladding. As can be seen, the protective material 42 permeates/infiltrates as an integrated gradient network. As can be seen, the protective material 42. has penetrated the oxide coating 34 shown in disarray and intermixed with the protective material in an intermediate portion Z, where X is the total diameter of the nuclear reactor cladding 30, while Y is the diameter of the cylindrical bore 38 and Q is the outer portion mixture of $ZrO_2$ and protective material with the highest density of protective material being at the final exterior 44 of the nuclear reactor cladding. Reactor coolant water is shown by arrow 46. As a means of judging distances, if X−Y=1,000 units; 2 Z=1 to 10 units=impregnation; and Q=100 to 600 units of outer particles+oxide+Zr alloy.

Figure 4:
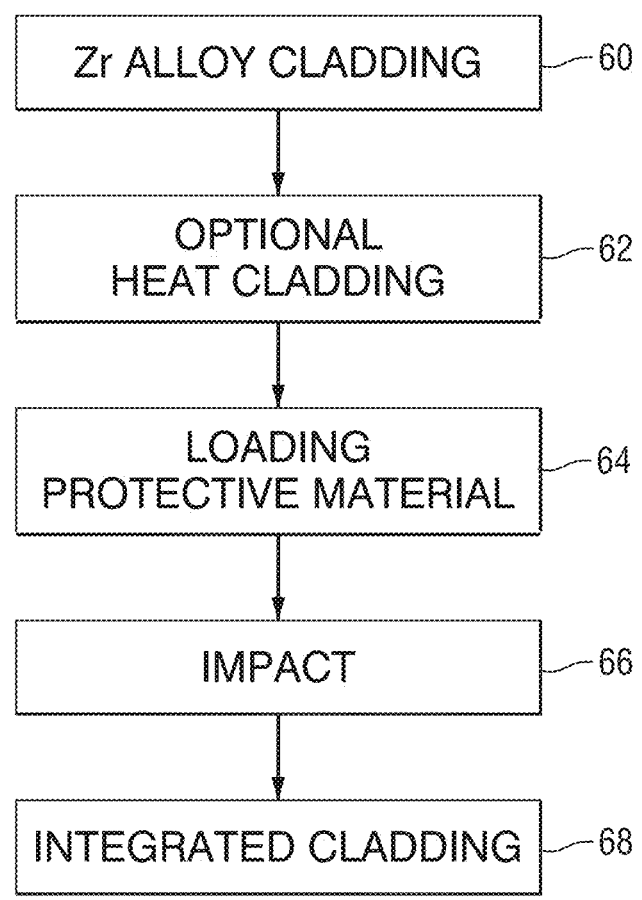
FIG. 4 illustrates a schematic flow diagram of the method of this invention.

Referring to FIG, 4, the method of the invention is schematically shown, In that FIG. 4, a cladding material is provided 60. Optionally, heating 62 the nuclear reactor cladding. Loading protective material into a hybrid thermal-kinetic deposition or cold thermal spray apparatus 64. Impacting at high velocity 66 the nuclear reactor cladding with the protective material, to impact through the $ZrO_2$ layer and into the base Zr tube as shown in FIG. 3C; providing an integrated gradient network 68 of protective particles, protective particles plus $ZrO_2$ and Zr and a base Zr.

Examples: Multiple zirconium "coupons" that were 48 mm long, 10 mm wide, and 3 mm thick were deposited with oxidation resistant material using the process described in the previous paragraphs. $Ti_2AlC$ was deposited using HVOF (high velocity oxygen fuel) on the coupons at a flame temperature of about 5,000° F. (2,760° C.), although the particle temperature did not tend to reach this value. Kerosene was used as the fuel. The $Ti_2AlC$ particle size range was 10 μm-60 μm and the spray velocity was approximately 2,000 ft/s-2,700 ft/s (600 m/s-800 m/s). The nozzle technology used in this spray process mimics that of a rocket engine.

Nanosteel® powder with a nominal size of 15 μm-53 μm was applied using a cold spray (which is also a type of hybrid thermal-kinetic deposition method) technique with a deposition temperature that ranged between 932° F.-1,652° F. (500° C. and 900° C.), although the particle temperature did not tend to reach this value. The cold spray particle velocity had a range between 2,230 ft/s and 3,500 ft/s (680 m/s-1,050 m/s and was In both applications, the zirconium coupons were not purposely heated during the deposition process. The zirconium coupons were then placed in an autoclave for 28 days at 800° F. (426.6° C.) and 1,500 psia to simulate accelerated exposure to the high-temperature and pressure conditions of a nuclear reactor, The results of these autoclave tests show that the deposition technique in concert with materials described above can prevent bulk oxidation of the zirconium surface in a reactor environment. Photomicrographs showed a gradient/impregnation impinging into the zirconium "coupons" mixing with the zirconium oxide, as shown in FIGS. 2 and 3C.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A zirconium alloy nuclear reactor cylindrical cladding, subject to a nuclear reactor environment, the cladding having an inner surface and inner volume of zirconium alloy, an outer surface and outer volume of a protective material consisting of Zr—Al, and an integrated middle volume of zirconium oxide, zirconium, and excess sound velocity-impacted protective material, where the highest density of protective material is at the cladding outer surface to protect the cladding from reactor environment and any further oxidation of the zirconium, where the integrated middle volume provides structural integrity for the cladding.

2. The nuclear reactor cylindrical cladding of claim 1, wherein the protective material penetrates through zirconium oxide and into zirconium alloy due to an impact velocity greater than 340 meters/second.

3. The nuclear reactor cylindrical cladding of claim 1, wherein the protective material penetrates through zirconium oxide and into zirconium alloy due to impact velocity between 400 m/s and 1,200 m/s.

4. The nuclear reactor cylindrical cladding of claim 1, wherein the protective material was applied by either a cold spray process or a thermal kinetic deposition.

5. The nuclear reactor cylindrical cladding of claim 4, wherein the temperature of the cold spray process is between 250° C. and 1,200° C., and for thermal-kinetic deposition, is between 1,200° C. and 3,500° C.

6. The nuclear reactor cylindrical cladding of claim 1, wherein the protective material comprises particles, wherein the size of the particles is between 1 μm and 500 μm.

7. The nuclear reactor cylindrical cladding of claim 1, wherein the protective material has a thickness of deposition, wherein the thickness of deposition of protective material is between 1 μm and 200 μm.

* * * * *